United States Patent [19]

Todorov et al.

[11] Patent Number: 4,672,854
[45] Date of Patent: Jun. 16, 1987

[54] CONVERTER OF THE RATE OF FLOW OF A FLUID

[75] Inventors: Dimiter T. Todorov; Slavtcho G. Djudjev; Kiril D. Yarumov, all of Sofia, Bulgaria

[73] Assignee: V M E I "Lenin", Sofia, Bulgaria

[21] Appl. No.: 795,089

[22] Filed: Nov. 5, 1985

[30] Foreign Application Priority Data

Nov. 5, 1984 [BG] Bulgaria .................................. 67412

[51] Int. Cl.⁴ .............................................. G01F 1/08
[52] U.S. Cl. .............................. 73/861.33; 73/861.79; 73/199
[58] Field of Search ................ 73/861.32, 861.79, 198, 73/861.77, 199

[56] References Cited

U.S. PATENT DOCUMENTS

| 4,011,757 | 3/1977 | Baatz | 73/861.79 |
| 4,393,724 | 7/1983 | Werkmann et al. | 73/861.79 |
| 4,433,583 | 2/1984 | Kirk | 73/861.33 |

Primary Examiner—Herbert Goldstein

[57] ABSTRACT

A converter of the rate of flow of a fluid is disclosed with a measuring chamber having a smooth internal outer surface and a cylindrical casing, disposed in the base of the eternal casing of the converter. An inlet chamber of a damper is formed from the side of a flexible membrane in the converter. Between the cylindrical casing and the base of the external casing, a free (clear) annular space is provided. On the external wall of the first half of said chamber there is a hole, while on the external wall of the other half of said chamber there is a compensation hole disposed in front of the tangential inlet of the cylindrical measuring chamber. A turbine wheel, disposed inside the chamber, has flat rectangular blades. In the axial outlet of the cylindrical measuring chamber, a guiding element is disposed with bottom and top transverse bases having the shape of circular sectors. The bottom and the top transverse bases are interconnected by a spiral surface in such manner that the circular section of the transverse base is disposed in front of the free section. Between the axial outlet of the cylindrical measuring chamber and the outlet chamber of the damper, a hydraulic throttle is shaped in the base of the external casing of the converter.

4 Claims, 5 Drawing Figures

CONVERTER OF THE RATE OF FLOW OF A FLUID

BACKGROUND OF THE INVENTION

This invention relates generally to a converter of the rate of flow of a fluid, which can be applied to measurement of the consumption of liquids and gases in the chemical and pharmaceutical industries and, more particularly, for recording the consumption of liquid fuel in motor vehicles.

U.S. Pat. No. 3,867,840 (1975) discloses a known converter of the rate of flow of a fluid having an external casing with inlet and outlet holes, in which casing is formed a cylindrical measuring chamber with tangential inlet and axial outlet. Inside the cylindrical measuring chamber is disposed, on bearings, a turbine wheel with three blades arranged at angles of 120°. The outer surface of the cylindrical measuring chamber is provided with longitudinal protrusions of triangular cross-section, while a photoelectric converter of frequency of rotation into electric signals is disposed in the plane of rotation of the turbine blades.

Operation of this converter is based upon the realization of a linear dependence between the frequency of rotation of the turbine wheel and the rate of flow of the measured fluid achieved by producing local hydraulic resistances by means of the protrusions of the cylindrical measuring chamber.

However, this known converter possess many disadvantages. These include the strong dependence of the error of measurement upon the density and the temperature of the measured fluid; the limited range of measurement due to the turbulence in the fluid flow when its velocity increases in the cylindrical measuring chamber; the complex shape of the cylindrical measuring chamber with protrusions; the number, configuration, and location of the protrusions, depending upon the parameters of the measured fluid, as well as the presence of a considerable dynamic error when measuring a pulsating flow of the fluid.

In another known converter of the rate of flow of a fluid, disclosed in U.S. Pat. No. 4,011,757 (1977), the design of which is somewhat analogous, a damper of the pulsations of the fluid flow is added. This damper is composed of an inlet chamber and an outlet chamber separated by a flexible membrane with a rigid center. The inlet chamber is connected hydraulically to the tangential inlet of the cylindrical measuring chamber, whereas the outlet chamber is connected to its axial outlet. In its initial position, the flexible membrane is pressed by a spiral spring against the face of the inlet hole of the converter, thus, partially closing the latter. By means of the pulsation damper, a smoothening is achieved of the pulsations of the fluid flow entering the cylindrical measuring chamber of the converter.

The disadvantage of this converter is the insufficient degree of smoothening of the pulsations of the fluid flow.

SUMMARY OF THE INVENTION

It is, therefore, the object of the present invention to develop a converter of the rate of flow of a fluid characterized by the following advantages:

the dependence of the error of measurement upon the density and temperature of the measured fluid is considerably reduced;

the range of measurement is broader;

the shape of the cylindrical measuring chamber is simplified; and the dynamic error of measurement is reduced in the case of pulsating flow of the fluid.

This object is attained according to the present invention by a converter of the rate of flow of a fluid having a cylindrical measuring chamber with a smooth internal outer surface and a cylindrical casing disposed in the base of the external casing of the converter. In the cylindrical casing, two half-chambers are formed from the side of the flexible membrane which half-chambers are part of the inlet chamber of the damper. Between the cylindrical casing and the base of the external casing, a free (clear) annular space is formed. A hole is defined on the external wall of the one half-chamber, with a compensation hole disposed opposite to the tangential inlet of the cylindrical measuring chamber. The compensation hole being defined on the external wall of the other half-chamber. The turbine wheel disposed in the chamber is composed of flat rectangular blades. A guiding element with bottom and top transverse bases having the shape of circular sectors disposed in the axial outlet of the cylindrical measuring chamber. The bottom transverse base closes part of the axial outlet of the cylindrical measuring chamber. The bottom and the top transverse bases are interconnected by a spiral surface arranged above the tangential inlet of the cylindrical measuring chamber so that the circular sector of the top transverse base is disposed opposite the free section formed in the cylindrical measuring chamber by the bottom transverse base. A hydraulic throttle is shaped in the base of the external casing of the converter between the axial outlet of the cylindrical measuring chamber and the outlet chamber of the damper.

Further advantages of the converter of the rate of flow of a fluid, according to the present invention, are a high accuracy of measurement in heavy load conditions, simplified design, and small overall dimensions.

For a better understanding of the invention, reference is made to the accompanying drawings which illustrate and describe a preferred embodiment of the invention.

DESCRIPTION OF THE PREFERRED EMBODIMENTS

Figure 1:
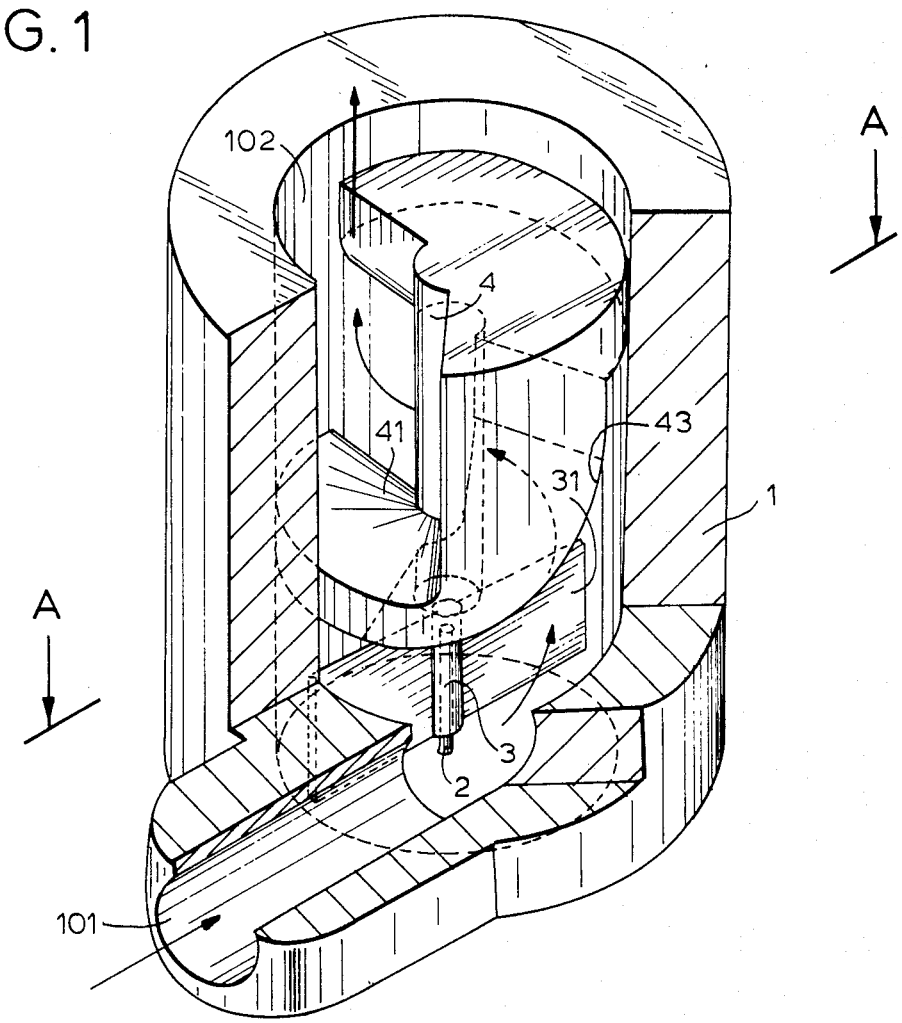
FIG. 1 is a partial cross-sectional axial perspective view of the cylindrical measuring chamber of the converter according to the present invention with the turbine wheel and a guiding element.

As shown in FIG. 1, the cylindrical measuring chamber 1 of the converter, which has a smooth cylindrical surface, is provided with a tangential inlet 101 and an axial outlet 102.

Figure 3:
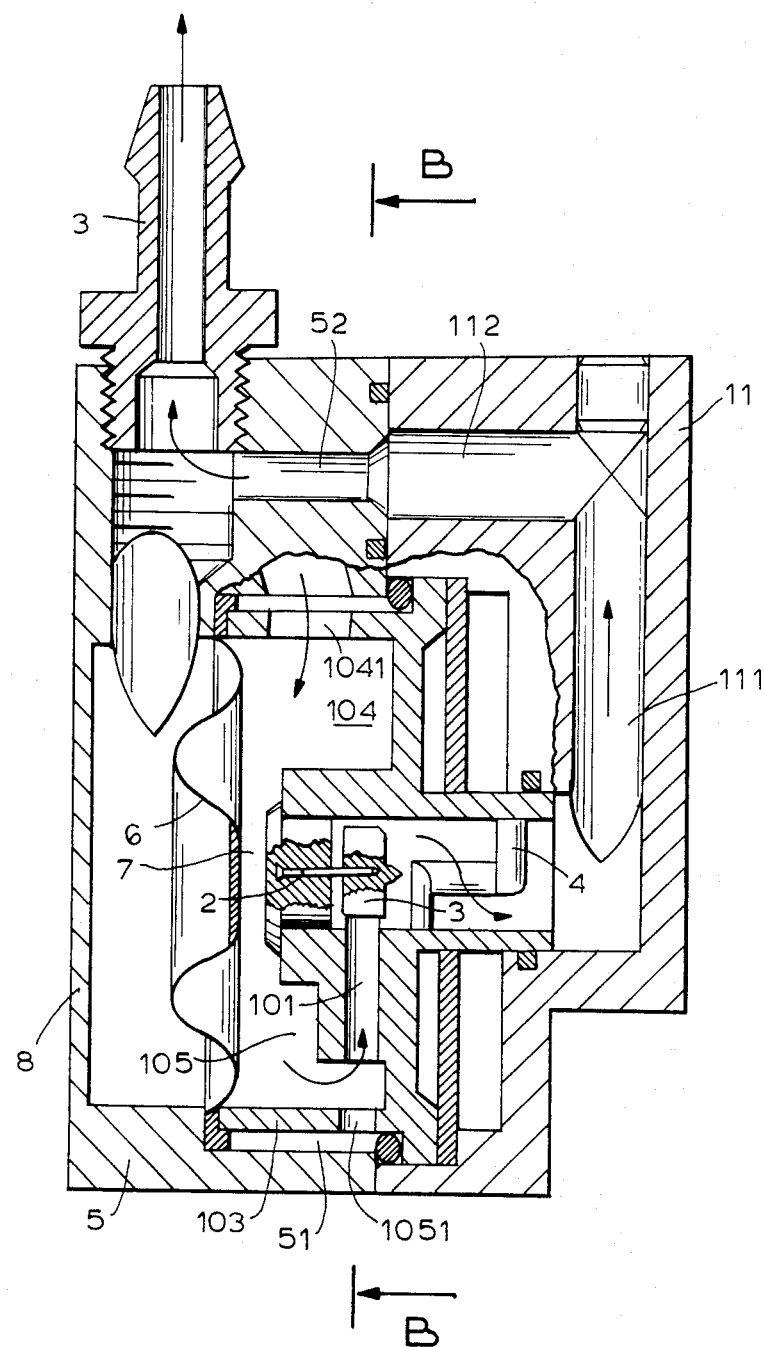
FIG. 3 is a cross-sectional elevational view of the converter of the rate of flow of a fluid.
Figure 4:
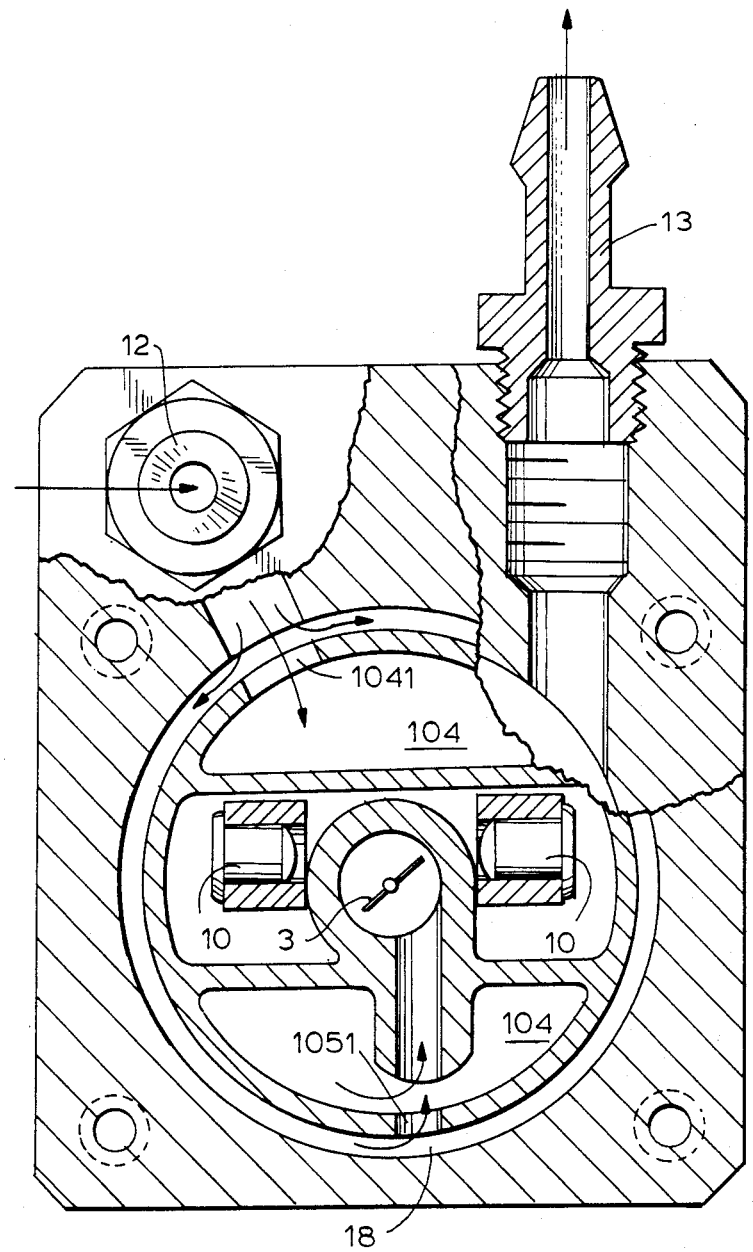
FIG. 4 is a cross-section elevational view looking along the line B—B of FIG. 3 through the tangential inlet of the cylindrical measuring chamber.

Turbine wheel 3 is provided with two straight blades 31,32 and is mounted on axle 2 of the measuring chamber. A guiding element 4 composed of a bottom transverse base 41 and a top transverse base 42 connected by the spiral surface 43 is located above the turbine wheel 3 in the cylindrical measuring chamber 1. The bottom transverse base 41 (FIG. 2) is shaped as a circular sector which closes only part of the section of the cylindrical measuring chamber 1, defining thereby a free (clear) section 106. The top transverse base 42 (FIG. 1) is a circular section disposed above the free section 106. The guiding element 4 sits in the cylindrical measuring chamber 1 in such manner that the beginning of the spiral sector 43 is arranged above the tangential inlet 101. The cylindrical measuring chamber 1, constructed of a material transparent to infra-red rays, has a cylindrical casing 103 (FIG. 3) disposed in the base 5 of the external casing of the converter with a free annular space 51 formed between them. A flexible membrane 6, which separates the inlet chamber 7 and the outlet chamber 8 of the converter's damper, is arranged between the base 5 and the cylindrical casing 103. Two half-chambers 104 and 105, which are sections of the inlet chamber 7, are formed inside the cylindrical casing 103 from the side of the flexible membrane 6. A hole 1041 is machined in the outer wall of the half-chamber 104, and a compensation hole 1051, disposed in front of the tangential inlet 101 of the cylindrical measuring chamber 1, is provided in the outer wall of the half-chamber 105. A board assembly 9 is attached onto the cylindrical casing 103. An emitter and a photoreceiver of the photoelectric converter 10 of the frequency of rotation (FIG. 4) are fastened, opposite each other, onto board assembly 9. The plate 9 (FIG. 3), together with the cylindrical casing 103, are held against the base 5 by a cover 11, in which cover are machined connecting conduits 111 and 112. An hydraulic throttle 52 is formed in the base 5, between the axial outlet 102 of the cylindrical measuring chamber 1 and the outlet chamber 8 of the damper. The inlet chamber 7 and the free annular space 51 are connected with the inlet hole 12 (FIG. 4) of the converter, while the outlet chamber 8 is connected with the outlet hole 13.

Figure 2:
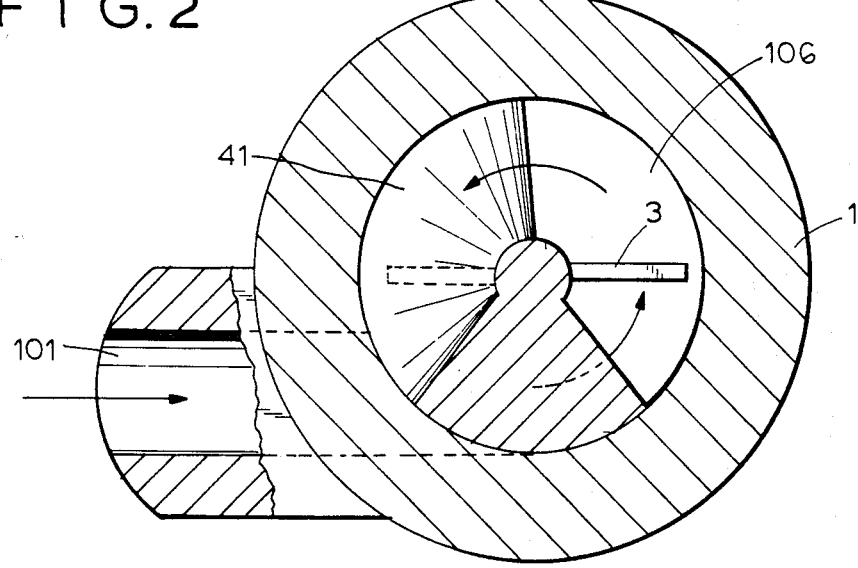
FIG. 2 is a cross-section looking down along the line A—A of the cylindrical measuring chamber of FIG. 1.
Figure 5:
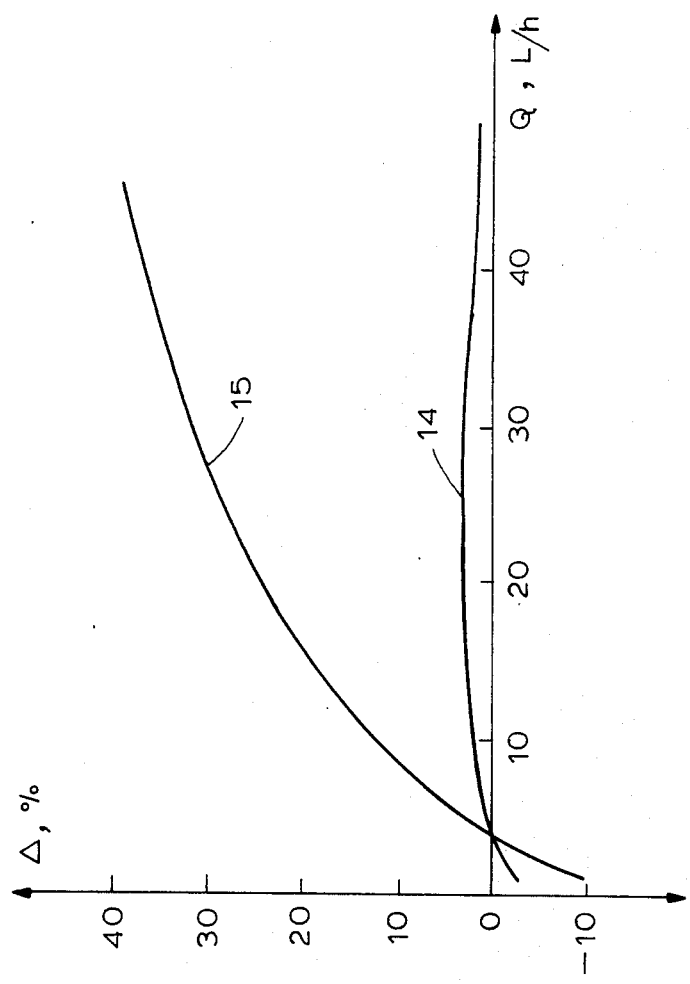
FIG. 5 shows the graph of the relative error ($\Delta$) as a function of the rate of flow (Q), for instance, when there is no guiding element (curve 15) and also when there is a guiding element (curve 14).

The converter of the rate of flow, according to the present invention, operates as follows:

The measured amount of fluid which enters the tangential inlet 101 (FIG. 1) is directed towards the cylindrical measuring chamber 1. A basic flow pattern is formed in the shape of a helix directed towards the axial outlet 102. A secondary flow develops in the bottom part of the chamber 1 on account of the entrainment of the fluid particles. This secondary flow rotates at an angular velocity depending upon the rate of flow of the flowing fluid. As a result of these flows, the turbine wheel 3 of the converter, according to the present invention, rotates at a frequency that is a function of the measured rate of flow. This function is non-linear (1) (FIG. 5) because of the substantial difference in the directions of the basic flow in the range of the low and the high values of the rate of flow, due to the cyclonal and centripetal effects, in the case of an axial or tangential outlet without guiding element. If there is a guiding element 4 (FIG. 1), the direction of the basic flow is maintained constant regardless of the variation of the rate of flow. Thus, at low values of the measured rate of flow, the spiral surface 43 and the bottom transverse base 41 constrain the basic flow to move along a helix, such flow "coupling" the blades 31 and 32 of the turbine wheel 3 at about 270 angular degrees (FIG. 2). Thereby the basic flow is always in interaction with one of the two blades 31 and 32 of the turbine wheel, resulting in its uniform rotation.

If the measured rate of flow increases, then as a result of the increased difference between the pressure of the fluid above the guiding element 4 (FIG. 1) and the pressure of the fluid underneath it, and also the shape of both its transverse bases 41 and 42, conditions are provided for rectifying the rotational motion of the basic flow in the axial outlet 102, thus compensating the influence of the cyclonal and centripetal effects. With an optimum disposition of the guiding element in the cylindrical measuring chamber 1, a linear dependence is attained between the frequency of rotation of the turbine wheel 3 and the rate of flow of the measured fluid. This frequency of rotation is converted into an impulse electrical signal by the photoelectric converter 10 (FIG. 4) when the light flux is crossed by the blades 31 and 32 of the turbine wheel 3.

As a result of the provision of an optimum direction of flow in the cylindrical measuring chamber, and the lack of hydraulic losses therein, the converter is not sensitive to variations in the temperature and density of the fluid, and provides great accuracy over a wide range of measurement.

When measuring the rate of flow of a pulsating stream, produced, for example, by a membrane-type fuel pump of a carburetor internal combustion engine, the operation of the converter is as follows:

The stepwise increase of the pressure of the fluid entering the inlet hole 12 of the converter results in a deformation of the flexible membrane 6 and is transmitted to the outlet hole 13 of the converter. Due to the resistance of the hydraulic throttle 52, as well as the total hydraulic resistance of the cylindrical measuring chamber 1 and the connecting conduits 111 and 112 (FIG. 3), the velocity of the fluid becomes considerably slowed through the cylindrical measuring chamber 1. Before the gradient of variation of the rate of flow through the cylindrical measuring chamber 1 increases to an inadmissibly high value which can result in dynamic error, an equalization of the pressure is achieved between the inlet hole 12 and the outlet hole 13 of the converter. At the next stepwise reduction of the pressure at the inlet hole 12 of the converter, the flexible membrane 6 returns, due to its elasticity, to its state of equilibrium, compensating the produced pressure drop in a similar manner.

The harmful resonance phenomena caused by the interaction of the source of pulsating fluid flow and the flexible membrane 6 is avoided by the local hydraulic resistances produced by the partial hydraulic separation of the half-chambers 104 and 105 in the inlet chamber 7 of the damper. The compensation hole 1051 in the outer wall of the half-chamber 105 serves the same purpose, since part of the fluid flow from the annular space 51 into the tangential inlet 101 of the cylindrical measuring chamber 1 passes through this hole. As a result of the de-phasing of the amplitude values of the velocities of this flow and of the flow entering from the inlet chamber 7 of the damper, the pulsations of the overall fluid flow passing through the cylindrical measuring chamber 1 are smoothed to a high degree.

Although the invention is described and illustrated with reference to a plurality of embodiments thereof, it is to be expressly understood that it is in no way limited to the disclosure of such preferred embodiments but is capable of numerous modifications within the scope of the appended claims.

We claim:

1. A converter of the rate of flow of a fluid, comprising:
- an external casing with a base, inlet and outlet means and connecting conduits;
- a cylindrical measuring chamber with tangential inlet and axial outlet,
- said cylindrical measuring chamber being disposed inside said external casing;
- a turbine wheel with flat rectangular blades, said turbine wheel being seated in bearings inside said cylindrical measuring chamber,
- said turbine wheel being disposed in front of said tangential inlet;
- a photoelectric converter of frequency of rotation of said turbine wheel,
- said photoelectric converter being disposed in the plane of said blades of said turbine wheel;
- a damper of pulsations of fluid flow,
- said damper being formed in said external casing,
- said damper composed of an inlet chamber and an outlet chamber separated by a flexible membrane,
- said inlet chamber of said damper being hydraulically connected to said tangential inlet of said cylindrical measuring chamber,
- said outlet chamber of said damper is connected to said axial outlet of said cylindrical measuring chamber and said outlet means of said external casing;
- said cylindrical measuring chamber has a cylindrical casing with a smooth internal surface,
- said cylindrical casing being disposed in said base of said external casing;
- a free annular space being defined between said cylindrical casing and said base of said external casing;
- an outer wall in a first half of said chamber defines a hole;
- an outer wall in a second half of said chamber defines a compensation hole,
- said compensation hole being disposed in front of said tangential inlet at an end of said tangential inlet opposite to said turbine wheel;
- a guiding element being disposed in said axial outlet of said cylindrical measuring chamber,
- said guiding element being composed of a spiral surface, a bottom transverse base and a top transverse base,
- said transverse bases being shaped as circular sectors,
- said bottom transverse base closes only part of a cross-section of the inside of said cylindrical measuring chamber, thereby defining a free section of said cross-section of said inside of said cylindrical measuring chamber,
- said transverse bases being interconnected by said spiral surface so that said circular sector of said top transverse base being disposed aligned to correspond to said free section of said cross-section defined by said bottom transverse base,
- said spiral surface begins above said tangential inlet of said cylindrical measuring chamber; and
- a hydraulic throttle being formed between said axial outlet of said cylindrical measuring chamber and said outlet chamber of said damper in said base.

2. The converter of the rate flow of a fluid according to claim 1, wherein
- two said flat rectangular blades,
- said two flat rectangular blades being disposed at an angle of 180° from each other.

3. The converter of the rate of low of a fluid according to claim 1, further comprising,
- said photoelectric converter has an emitter and a photoreceiver; and
- a board assembly attached inside said cylindrical casing,
- said emitter and said photoreceiver being fastened opposite each other on said board assembly, on opposite sides of said turbine wheel.

4. The converter of the rate of flow of a fluid according to claim 3, further comprising
- a cover,
- said cover contains said connecting conduits of said external casing,
- said cover holds said board assembly and said cylindrical casing against said base.

* * * * *